May 20, 1930.  F. E. LICHTENTHAELER  1,759,122
METHOD OF MAKING ALCOHOL
Filed Jan. 26, 1924
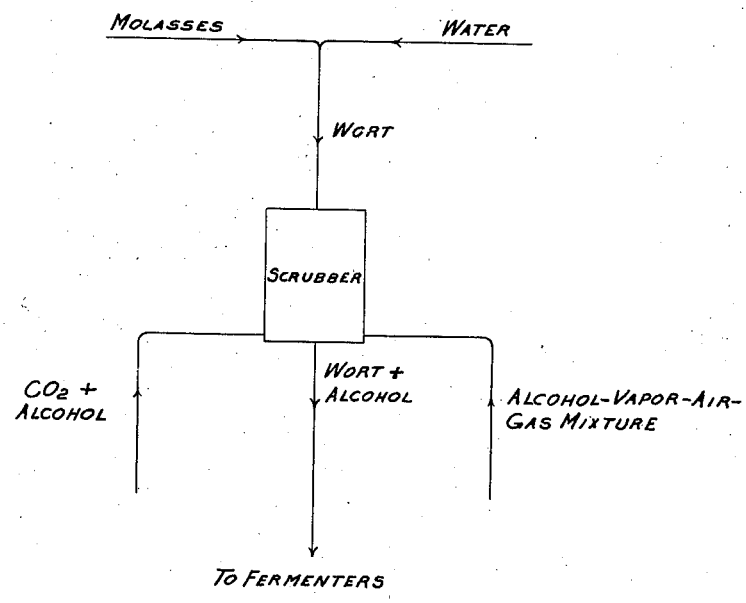

Patented May 20, 1930

1,759,122

UNITED STATES PATENT OFFICE

FRANK E. LICHTENTHAELER, OF NEWTON HIGHLANDS, MASSACHUSETTS

METHOD OF MAKING ALCOHOL

Application filed January 26, 1924. Serial No. 688,844.

The present invention relates to an improved method of making alcohol.

The object of the invention is to effect economies in the process, and the invention consists in the method hereinafter described and particularly defined in the claims.

The accompanying drawing is a flow sheet illustrating the operation of the method.

In the operation of alcohol manufacturing plants there are ordinarily some losses of alcohol as vapor and vapor-air-gas mixtures. Final condensers are vented to the atmosphere, and these vents carry off some alcohol vapor, especially when the cooling water is comparatively warm. In the fermentation process large amounts of carbon dioxide are evolved. This gas having been in contact with the alcoholic mash passes out more or less saturated with alcohol. The discharge from the condenser and from the alcoholic mash represent, in the continuous operation of alcohol manufacture, an appreciable loss. Furthermore, air in alcohol tanks discharged from the vent pipe by incoming alcohol is a further source of alcohol loss. This and other similar alcohol losses are prevented according to the present invention by scrubbing the vapors discharged with the mixture of molasses and water which is being introduced into the alcohol manufacturing apparatus. This process is adapted for use in connection with alcohol manufacture by a continuous method. The manufacture of the alcohol is carried on by continuously mixing molasses and water to form a wort, introducing this wort into the top of a scrubber, into the bottom of which any vents discharging waste alcohol-vapor-air-gas mixtures are led and the previously mixed molasses and water flows down through the scrubber and causes the intimate contact of the alcohol-vapor-air-gas mixtures with the wort flowing in the opposite direction. As shown in the accompanying drawing, the evolved carbon dioxide saturated with alcohol which is discharged from the fermenters is admitted to the scrubber at one point and other alcohol-vapor-air-gas mixtures are admitted to the scrubber at another point. These latter alcohol-vapor-air-gas mixtures may be waste mixtures discharged from the alcohol tanks. As a result, the alcohol which would ordinarily be wasted is absorbed by the wort and carried along with it to the fermenters. The process of distilling and condensing distillate from the fermented wort is or may be carried out in continuous alcohol manufacturing apparatus.

This method contemplates the method of manufacturing alcohol wherein the waste vapor-air-gas effluents of the method are subjected to scrubbing by the wort to absorb their alcohol content, effects a substantial economy in the elimination of the losses otherwise due to the escape of the alcohol-vapor-air-gas mixtures.

The method also contemplates the step in the manufacture of alcohol which consists in subjecting alcohol-vapor-air-gas mixtures to scrubbing by unfermented wort or water or water-mixtures of substances entering the process.

This method has conspicuous advantages over a method which has heretofore been proposed of absorbing the alcohol content of the alcohol-vapor-air-gas mixtures by means of a stream of water, and recovering the alcohol by distillation. According to the present invention, all of the effluent alcohol-vapor-air-gas mixtures are subjected to the scrubbing action of water or water-mixtures entering the alcohol manufacturing process.

Having thus described the invention, what is claimed is:

1. The continuous method of making alcohol which consists in mixing molasses and water to form unfermented wort, producing alcohol therein by fermenting the wort, distilling the fermented wort to obtain alcohol, collecting the vapor-air-gas products of the fermentation and distillation, and subjecting the products to scrubbing by the entering unfermented wort to absorb and recover their alcoholic content.

2. The continuous method of making alcohol which consists in mixing molasses and water to form unfermented wort, producing alcohol therein by fermenting the wort, distilling the fermented wort to obtain alcohol, collecting the vapor-air-gas products of the fermentation, and subjecting the products to scrubbing by the entering unfermented wort to absorb and recover their alcoholic content.

3. The step in the method of making alcohol by fermentation and distillation wherein an unfermented wort enters the process and wherein alcohol-vapor-air-gas mixture products are evolved, which consists in scrubbing the alcohol-vapor-air-gas mixture with the entering unfermented wort to recover the otherwise wasted alcohol from the alcohol-vapor-air-gas mixture.

4. The step in the method of making alcohol by fermentation and distillation wherein water substances enter the process and wherein alcohol-vapor-air-gas mixture products are evolved, which consists in scrubbing the alcohol-vapor-air-gas mixture products by the water substances to recover the otherwise wasted alcohol from the alcohol-vapor-air-gas mixture.

5. The continuous method of making alcohol which consists in continuously introducing unfermented wort, producing alcohol therein by fermentation, collecting vapor-air-gas products of the fermentation and removing their alcoholic content by scrubbing them with the unfermented wort entering the process.

6. The continuous method of making alcohol which consists in continuously introducing an unfermented wort of molasses and water into a zone of alcohol fermentation to produce alcohol therein, drawing off fermented wort containing alcohol from the fermentation zone, distilling the fermented wort to separate the alcohol therefrom, collecting alcohol vapor-air-gas mixtures produced in such fermentation and distillation zones, and subjecting the vapor-air-gas mixtures to scrubbing by entering unfermented wort before it is introduced into the fermentation zone to introduce the alcohol content into the materials entering the process to effect its recovery.

FRANK E. LICHTENTHAELER.